US008543871B2

(12) United States Patent
Ritz et al.

(10) Patent No.: US 8,543,871 B2
(45) Date of Patent: *Sep. 24, 2013

(54) CORRELATING HARDWARE DEVICES BETWEEN LOCAL OPERATING SYSTEM AND GLOBAL MANAGEMENT ENTITY

(75) Inventors: Andrew J. Ritz, Sammamish, WA (US); Santosh S. Jodh, Sammamish, WA (US); Ellsworth D. Walker, Seattle, WA (US); John A. Strange, Rye, CO (US); Michael G. Tricker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/289,776

(22) Filed: Nov. 4, 2011

(65) Prior Publication Data

US 2012/0054538 A1 Mar. 1, 2012

Related U.S. Application Data (63) Continuation of application No. 11/675,261, filed on Feb. 15, 2007, now Pat. No. 8,086,906.

(51) Int. Cl.
*G06F 11/00* (2006.01)

(52) U.S. Cl.
USPC .......................................................... 714/48

(58) Field of Classification Search
None
See application file for complete search history.

(56) References Cited

U.S. PATENT DOCUMENTS

| | | | |
|---|---|---|---|
| 5,345,590 | A | 9/1994 | Ault et al. |
| 5,491,788 | A | 2/1996 | Cepulis et al. |
| 5,689,701 | A | 11/1997 | Ault et al. |
| 5,815,731 | A | 9/1998 | Doyle et al. |
| 5,913,058 | A | 6/1999 | Bonola |
| 6,199,179 | B1 | 3/2001 | Kauffman et al. |
| 6,226,734 | B1 | 5/2001 | Kleinsorge et al. |
| 6,247,109 | B1 | 6/2001 | Kleinsorge et al. |
| 6,421,679 | B1 | 7/2002 | Chang et al. |
| 6,502,162 | B2 | 12/2002 | Blumenau et al. |
| 6,546,415 | B1 | 4/2003 | Park et al. |
| 6,574,748 | B1 | 6/2003 | Andress et al. |

(Continued)

FOREIGN PATENT DOCUMENTS

| | | |
|---|---|---|
| CN | 101542433 | 9/2009 |
| CN | 101553791 | 10/2009 |

(Continued)

OTHER PUBLICATIONS

"Final Office Action", U.S. Appl. No. 11/675,261, (Oct. 5, 2010), 10 pages.

(Continued)

*Primary Examiner* — Yolanda L Wilson
(74) *Attorney, Agent, or Firm* — Wolfe-SBMC (57) ABSTRACT

A method and apparatus for correlating the identities of hardware devices, such as processors or memory controllers, between a local operating system and a global management entity is described. In an embodiment a fault message including a local identifier of a faulting device is received from an operating system. A global identifier of the faulting device is determined that is different from the local identifier. An appropriate replacement device is then selected based on the global identifier of the faulting device, and the selected replacement device is mapped to the faulting device.

20 Claims, 4 Drawing Sheets

(56) References Cited

U.S. PATENT DOCUMENTS

| | | |
|---|---|---|
| 6,598,174 B1 | 7/2003 | Parks et al. |
| 6,640,278 B1 | 10/2003 | Nolan et al. |
| 6,684,230 B1 | 1/2004 | Momoh et al. |
| 6,792,564 B2 * | 9/2004 | Ahrens et al. .......... 714/45 |
| 6,895,586 B1 | 5/2005 | Brasher et al. |
| 6,907,474 B2 | 6/2005 | Oshins et al. |
| 6,986,014 B2 | 1/2006 | Qureshi et al. |
| 7,007,192 B2 | 2/2006 | Yamazaki |
| 7,039,827 B2 | 5/2006 | Meyer et al. |
| 7,051,243 B2 | 5/2006 | Helgren et al. |
| 7,065,761 B2 | 6/2006 | Foster et al. |
| 7,114,064 B2 | 9/2006 | Ramesh et al. |
| 7,171,590 B2 | 1/2007 | Kadoi |
| 7,275,180 B2 | 9/2007 | Armstrong et al. |
| 7,343,515 B1 | 3/2008 | Gilbertson et al. |
| 7,363,394 B2 | 4/2008 | Shen et al. |
| 7,404,105 B2 | 7/2008 | Arai |
| 7,426,657 B2 | 9/2008 | Zorek et al. |
| 7,480,911 B2 | 1/2009 | Lee et al. |
| 7,493,515 B2 | 2/2009 | Armstrong et al. |
| 7,509,375 B2 | 3/2009 | Christian et al. |
| 7,543,182 B2 | 6/2009 | Branda et al. |
| 7,562,262 B2 | 7/2009 | Kondajeri et al. |
| 7,934,121 B2 | 4/2011 | Ritz et al. |
| 8,086,906 B2 | 12/2011 | Ritz |
| 2002/0016892 A1 | 2/2002 | Zalewski et al. |
| 2002/0053009 A1 | 5/2002 | Selkirk et al. |
| 2002/0144193 A1 | 10/2002 | Hicks et al. |
| 2002/0170039 A1 | 11/2002 | Kovacevic |
| 2003/0037278 A1 | 2/2003 | Olarig |
| 2003/0163744 A1 | 8/2003 | Yamazaki |
| 2003/0212884 A1 | 11/2003 | Lee et al. |
| 2004/0107383 A1 | 6/2004 | Bouchier et al. |
| 2004/0193950 A1 | 9/2004 | Gagne et al. |
| 2004/0221193 A1 | 11/2004 | Armstrong et al. |
| 2005/0283641 A1 | 12/2005 | Clark et al. |
| 2006/0010344 A1 | 1/2006 | Zorek, Sr. et al. |
| 2006/0095624 A1 | 5/2006 | Raj et al. |
| 2007/0061634 A1 | 3/2007 | Marisetty et al. |
| 2007/0067673 A1 | 3/2007 | Avizienis |
| 2008/0010527 A1 | 1/2008 | Lu |
| 2008/0028413 A1 | 1/2008 | Conklin et al. |
| 2008/0120486 A1 | 5/2008 | Ritz et al. |
| 2008/0120515 A1 | 5/2008 | Ritz et al. |
| 2008/0120518 A1 | 5/2008 | Ritz et al. |
| 2008/0201603 A1 | 8/2008 | Ritz |
| 2010/0262590 A1 | 10/2010 | Holt |
| 2011/0161729 A1 | 6/2011 | Ritz et al. |

FOREIGN PATENT DOCUMENTS

| | | |
|---|---|---|
| JP | 2010510592 | 4/2010 |
| KR | 20090081405 | 7/2009 |
| KR | 20090082242 | 7/2009 |
| WO | WO-2008064198 | 5/2008 |
| WO | WO-2008064213 | 5/2008 |
| WO | WO-2008073683 | 6/2008 |

OTHER PUBLICATIONS

"Final Office Action", U.S. Appl. No. 11/675,261, (Aug. 4, 2011), 4 pages.

"International Search Report", PCT/US2007/085180, (Apr. 21, 2008), 2 pages.

"International Search Report", PCT/US2007/085184, (Mar. 28, 2008), 2 pages.

"International Search Report", PCT/US2007/085216, (Apr. 22, 2008), 2 pages.

"Non-Final Office Action", U.S. Appl. No. 11/675,261, (Mar. 29, 2010), 9 pages.

"Non-Final Office Action", U.S. Appl. No. 11/675,261, (Mar. 4, 2011), 10 pages.

"Notice of Allowance", U.S. Appl. No. 11/675,261, (Aug. 24, 2011), 8 pages.

"Written Opinion of the International Searching Authority", PCT/US2007/085180, (Apr. 21, 2008), 3 pages.

"Written Opinion of the International Searching Authority", PCT/US2007/085216, (Apr. 22, 2008), 4 pages.

"Written Opinion of the International Searching Authority", PCT/US2007/085184, (Mar. 28, 2008), 3 pages.

Fletcher, M et al., "Realtime Reconfiguration Using an IEC 61499 Operating System", *Proceedings of the 15th International Parallel & Distributed Processing Symposium*, San Francisco, Calif, Apr. 23-27, 2001., (Apr. 2001), 7 pages.

Milojicic, D et al., "Global Memory Management for a Multi Computer System", *Proceedings of the 4th USENIX Windows Symposium*, Seattle, Wash., Aug. 3-4, 2000., (Aug. 2000), 12 pages.

Moore, R.W. et al., "Knowledge-Based Grids", *Proceedings of the 18th IEEE Symposium on Mass Storage Systems*, Apr. 17-20, 2001, San Diego, Calif., 2000, (2000), pp. 29-39.

"Advisory Action", U.S. Appl. No. 11/675,290, (Dec. 7, 2010), 3 Pages.

"Chinese First Office Action", Application No. 200780042949.6, (Aug. 4, 2010), 8 Pages.

"Chinese First Office Action", Application No. 200780042958.5, (Sep. 13, 2010), 3 Pages.

"Chinese First Office Action", Application No. 200780042960.2, (Nov. 4, 2010), 10 Pages.

"Chinese Notice of Grant", Application No. 2000780042960.2, (Jul. 26, 2012), 4 pages.

"Chinese Notice of Grant", Application No. 200780042958.5, (Nov. 6, 2012), 4 pages.

"Chinese Office Action", Application No. CN200780042958.5, Decision of Rejection, (Jun. 24, 2011), 5 pages.

"Chinese Second Office Action", Application No. 200780042958.5, (Apr. 17, 2012), 3 pages.

"Chinese Second Office Action", Application No. 200780042960.2, (Nov. 30, 2011), 6 pages.

"Chinese Third Office Action", Application No. 200780042960.2, (Mar. 22, 2201), 6 pages.

"European Search Report", Application No. 07864653.6, (Nov. 17, 2011), 7 Pages.

"Final Office Action", U.S. Appl. No. 11/657,243, (Feb. 19, 2010), 12 Pages.

"Final Office Action", U.S. Appl. No. 11/675,243, (Jun. 1, 2012), 11 pages.

"Final Office Action", U.S. Appl. No. 11/675,272, (Mar. 18, 2009), 9 Pages.

"Final Office Action", U.S. Appl. No. 11/675,290, (Jan. 27, 2010), 9 Pages.

"Final Office Action", U.S. Appl. No. 11/675,290, (Oct. 4, 2010), 11 pages.

"Intel Hyper-Threading Technology Technical Users Guide", Intel Corporation,(Jan. 2003), 44 pages.

"Issue Notification", U.S. Appl. No. 11/675,272, (Jan. 5, 2011), 1 Page.

"Issue Notification", U.S. Appl. No. 11/675,290, (Apr. 6, 2011), 1 Page.

"Non Final Office Action", U.S. Appl. No. 13/044,391, (Nov. 6, 2012), 11 Pages.

"Non-Final Office Action", U.S. Appl. No. 11/675,243, (Aug. 7, 2009),12 Pages.

"Non-Final Office Action", U.S. Appl. No. 11/675,243, (Dec. 8, 2011),15 Pages.

"Non-Final Office Action", U.S. Appl. No. 11/675,272, (Aug. 7, 2009), 10 Pages.

"Non-Final Office Action", U.S. Appl. No. 11/675,290, (May 24, 2010), 10 Pages.

"Non-Final Office Action", U.S. Appl. No. 11/675,290, (Jun. 24, 2009), 9 Pages.

"Notice of Allowance", U.S. Appl. No. 11/675,243, (Feb. 26, 2013), 8 Pages.

"Notice of Allowance", U.S. Appl. No. 11/675,272, (Sep. 21, 2010), 19 Pages.

"Notice of Allowance", U.S. Appl. No. 11/675,290, (Jan. 19, 2011), 7 Pages.

"Notice of Allowance", U.S. Appl. No. 11/675,243, (Sep. 27, 2012), 8 Pages.

"Notice of Allowance", Application No. 70080042960.2, (Jul. 25, 2012), 6 Pages.

"Notice of Allowance", Application No. CN200780042958.5, (Nov. 6, 2012), 6 Pages.

"Reply to Chinese Office Examination along with Amended Action", Application No. 200780042958.5, Request for Re-Examination along with Amended Claims in the response, (Sep. 23, 2011), 14 pages.

"Reply to EP Communication", Application No. EP0786465.6, (Jun. 15, 2012), 14 pages.

"Reply to First Chinese Office Action", Application No. 200780042958.5, (Nov. 18, 2010), 13 Pages.

"Reply to First Chinese Office Action", Application No. 200780042960.2, (Dec. 10, 2010), 7 Pages.

"Reply to Second Chinese Office Action", Application No. 200780042958.5, (Jun. 15, 2012), 12 Pages.

"Reply to Second Chinese Office Action", Application No. 200780042960.2, (Dec. 16, 2011), 2 pages.

"Reply to Third Chinese Office Action", Application No. 200780042960.2, (May 21, 2012), 8 Pages.

Nguyen, Khang et al., "Detecting Multi-Core Processor Topology in an IA-32 Platform", Intel Corporation,(2006), 17 pages.

Shanley, Tom et al., "The Unabridged Pentium 4 IA32 Processor Genealogy", Addison Wesley, Retrieved from Safari Books Online,(Jul. 26, 2004), 8 pages.

"Final Office Action", U.S. Appl. No. 13/044,391, (Apr. 11, 2013), 17 Pages.

\* cited by examiner

CORRELATING HARDWARE DEVICES BETWEEN LOCAL OPERATING SYSTEM AND GLOBAL MANAGEMENT ENTITY

CROSS-REFERENCES TO RELATED APPLICATIONS

This application is a continuation of, and claims priority to, U.S. patent application Ser. No. 11/675,261, filed Feb. 15, 2007, which is incorporated herein by reference. This application is also related to U.S. patent application Ser. No. 11/675,272, filed on Feb. 15, 2007, U.S. patent application Ser. No. 11/675,290, filed on Feb. 15, 2007, and U.S. patent application Ser. No. 11/675,243, filed on Feb. 15, 2007, which are incorporated herein by reference.

BACKGROUND

A microprocessor is an electronic device capable of performing the processing and control functions for computing devices such as desktop computers, laptop computers, server computers, cell phones, laser printers, and so on. Conventionally, a microprocessor comprises a small plastic or ceramic package that contains and protects a small piece of semiconductor material that includes a complex integrated circuit. Leads connected to the integrated circuit are attached to pins that protrude from the package allowing the integrated circuit to be connected to other electronic devices and circuits. Microprocessors are usually plugged into or otherwise attached to a circuit board containing other electronic devices.

While a microprocessor integrated circuit may include only one computing unit, i.e., one processor, it is possible to include multiple processors in a microprocessor integrated circuit. The multiple processors, which are often referred to as "cores," are included in the same piece of semiconductor material and connected to the microprocessor package pins. Having multiple cores increases the computing capability of the microprocessor. For example, a microprocessor with four cores can provide almost the same amount of computing capability as four single-core microprocessors.

There has been an increase in the use of multiple microprocessors and multiple-core microprocessors in traditional computing devices. Traditional computing devices are capable of running only one instance of an operating system. Even traditional computing devices that contain multiple-core microprocessors, multiple microprocessors, or multiple multiple-core microprocessors are only capable of running one instance of an operating system. Still, harnessing the increased computing capability that multiple-core microprocessors provide allows computing functions, which were previously executed by multiple computing devices, to be executed with fewer computing devices.

For example, a server is a computing device connected to a network that provides a service or set of services to other entities connected to the network. A server comprising 32 traditional computing devices, i.e., a 32 way server, may be comprised of eight microprocessors, each having four cores. Taking the concept one step further, if each individual core is eight times more capable than one of the 32 computing devices, the 32-way server's capabilities can be provided by the four core microprocessor. A clear advantage of such a four core server is that computing resource redundancy is more affordable than that provided by traditional servers. In addition, reducing the number of microprocessors reduces the cost of the server, the amount of energy used to power the server, and the amount of maintenance the server requires.

It is possible to use "partitions" to take greater advantage of the computing capabilities of multiple-core microprocessors A partition is an electrically isolatable set of electronic devices, e.g., processors, memory, etc., within a computing device that can run an independent instance of an operating system, i.e., a local operating system. A partitionable computing device is a computing device that can be divided into partitions and thus is able to run multiple local operating systems. A partitionable server is a server that is a partitionable computing device and thus able to run multiple local operating systems. A partition of a partitionable server may also be referred to as a "logical server." That is, to other entities on a network a logical server appears to be a stand-alone server, even though it is not. It also possible to assemble a plurality of servers, logical or otherwise, into a "server cluster." A server cluster is a plurality of servers that behave as a unit to provide a service or set of services.

The advantages of using multiple-core microprocessors is driving a trend toward "server consolidation." Server consolidation is the process of replacing multiple servers, for example in a server cluster, with fewer servers, e.g., one server. A server that replaces multiple servers may contain computing capability that equals or exceeds the capabilities of the multiple servers. While reducing costs, energy, and maintenance, server consolidation has the effect of putting all of one's eggs into one basket. Server consolidation may increase the impact of a server failure. For example, if multiple applications, which used to run on multiple servers, are all run on the same server, and that server fails, the impact is likely to affect all of the applications. In the worst case, this means application downtime. To guard against such an impact, many high end servers, i.e., servers with a large amount of computing capability, apply a portion of their capabilities to reliability features.

One such reliability feature is "failover" capability. Failover is the ability of a first entity to pass the information the first entity contains onto a second similar entity preferably before the first entity completely fails. Techniques have been developed for traditional servers, i.e., servers based on traditional computing devices, to perform failover in a controlled and orderly fashion to ensure that no data is lost and no ongoing processes are interrupted during the transition from the failing server to the replacement server.

In order to create multiple-core microprocessor servers that are as robust and reliable as traditional servers, similar techniques that operate at the processor level are useful.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Methods and apparatus for correlating the identities of hardware devices, such as the processors and memory controllers of multiple-core microprocessors, between a local operating system and global management entity is disclosed.

When an operating system detects a faulting device, the operating system generates a fault message and transmits the fault message to a management entity. The management entity determines the identity of the faulting device based on the fault message, selects an appropriate replacement device, and changes a routing table to map the identity of the replacement device to the identity of the faulting device. The management entity then transmits the global identity of the replacement device to the operating system and the operating system correlates the local identity of the replacement device with the global identity of the replacement device.

DETAILED DESCRIPTION

A server is a computing device connected to a network that provides a service or set of services to other entities, e.g., computing devices, connected to the network. For example, a web page server provides a service that returns web pages in response to web page requests. Other exemplary servers are an email server that returns email messages for particular users, a video server that returns video clips from a video archive, etc. An exemplary server contains a microprocessor, a memory controller, and memory blocks controlled by the memory controller. The memory controller and the memory blocks controlled by the memory controller are often referred to as a unit, i.e., a memory unit. Servers may also contain additional microprocessors, memory controllers, memory blocks, and other electronic devices such as interrupt processors. Hence, servers containing only a microprocessor and memory unit should be construed as exemplary and not limiting.

As with many types of computing devices, the operation of a server is controlled by a software program called an operating system. Traditional computing devices are capable of running only one instance of an operating system. Hence a traditional server, i.e., a server based on a traditional computing device or traditional computing devices, executes the instructions contained in a copy of the operating system, i.e., an instance of the operating system. For example, a server comprising 32 traditional computing devices, i.e., a 32 way server, may be comprised of eight microprocessors, each having four cores and yet run one operating system. Reducing the number of microprocessors reduces the cost of the server, the amount of energy u to power the server, and the amount of maintenance the server requires.

Partitions make it possible to take even greater advantage of the computing capabilities of multiple-core microprocessors A partition is an electrically isolatable set of electronic devices, e.g., processors, memory, etc., within a computing device that can run an independent instance of an operating system, i.e., a local operating system. A partitionable computing device is a computing device that can be divided into partitions and thus is able to run multiple local operating systems. A partitionable server is a server that is a partitionable computing device and thus able to run multiple local operating systems. A partition of a partitionable server may also be referred to as a "logical server." Hence, one partitionable server may contain multiple logical servers. A plurality of servers, logical or otherwise, may be assembled into a "server cluster" that behaves as a unit to provide a service or set of services.

Preferably, partitioning is dynamic. That is, partition units are assigned to, or removed from, partitions with little or no impact on the services the server provides. A server that is capable of being partitioned is a partitionable server. A server system, i.e., system, comprising partitionable servers is a partitionable system. A partitionable system provides flexibility in the number and configuration of partition units and electronic devices assigned to a partition and makes it easier and more cost-effective to support "server consolidation."

Server consolidation is the process of replacing multiple servers with fewer servers or perhaps even only one server. An exemplary server that is the result of a server consolidation may contain computing capability that equals or exceeds the capabilities of the multiple servers that the server replaces. Server consolidation may increase the impact of a server failure. For example, imagine multiple applications that used to run on the multiple servers are all run on the one server. If the server fails, the impact is likely to affect all of the applications and even cause application downtime.

Traditional servers guard against such an impact by applying a portion of the servers' computing capability to reliability features such as "failover" capability. Techniques have been developed for traditional servers to perform failover in a controlled and orderly fashion to ensure that no data is lost and no ongoing processes are interrupted during the transition from the failing server to the replacement server. Since traditional servers connect to each other through a network and are thus not tightly tied together, work is broken into small pieces and shared across the servers, i.e., packetized. This makes it easy to replace a failing server since the failing server's work packets can be re-routed during failover. Notice that in order to implement failover, there must be more than one traditional server available. That is, a failing traditional server needs another similar traditional server able to accept data from the failing traditional server.

Since a partitionable server may contain multiple logical servers, which can communicate more easily than traditional servers tied together by a network, a partitionable server has the potential to provide reliability more easily and cost-effectively than a group of traditional servers. Processes for controlled and orderly failover that operate using the partitions in a partitionable server help realize the reliability partitionable servers can provide.

It is impractical to make partitionable servers more reliable by notifying each of the high-level software applications when a failover is implemented. To enable high-level software applications to respond to such a notification would require that the computer code for each application be modified to adapt to the failover. Even notifying applications would probably not be enough to provide failover without a mechanism to replace a portion of a running server. Instead, it is more practical and advantageous to involve only the lowest level software in the failover and allow the upper level software, e.g., applications, to behave as though no hardware change has happened.

An implementation of an orderly, low-level, partitionable server failover involves a global management entity and one or more local operating systems. Examples of a global management entity are a service processor (SP) and a baseboard management controller (BMC). An SP is a specialized microprocessor or microcontroller that manages electronic devices attached to a circuit board or motherboard, such as memory controllers and microprocessors. A BMC is also a specialized microcontroller embedded on a motherboard. In addition to managing electronic devices, a BMC monitors the input from sensors built into a computing system to report on and/or respond to parameters such as temperature, cooling fan speeds, power mode, operating system status, etc. Other electronic devices may fulfill the role of a global management entity. Hence, the use of an SP or BMC as a global management entity should be construed as exemplary and not limiting.

A local operating system is an instance of an operating system that runs on one partition. Partition units are assigned to a specific partition to ensure that the devices in the partition unit cannot be shared with devices in other partitions, ensuring that a failure will be isolated to a single partition. Such a partition unit may indicate which physical addresses are serviced by a given memory controller and, thereby, map the physical memory addresses to the memory controller and to the physical partition unit containing the memory controller. More than one partition unit may be used to boot and operate a partition. Unused or failing partition units may be electrically isolated. Electrically isolating partition units is similar to removing a server from a group of traditional servers with the advantage that partition units may be dynamically reassigned to different partitions.

In the foregoing discussion, unless otherwise noted, a partition unit comprises a single core and a single memory unit. However, partition units may comprise more than one core, memory unit, interrupt processor, and/or other devices that provide computing services and/or support. Hence, the use of partition units comprising a core and a memory controller should be construed as exemplary and not limiting. Managing, e.g., adding or replacing, the partition units in a partitionable server allows a failover to be performed in a controlled and orderly fashion to ensure that the partitionable server is as robust and reliable as traditional servers.

Figure 1:
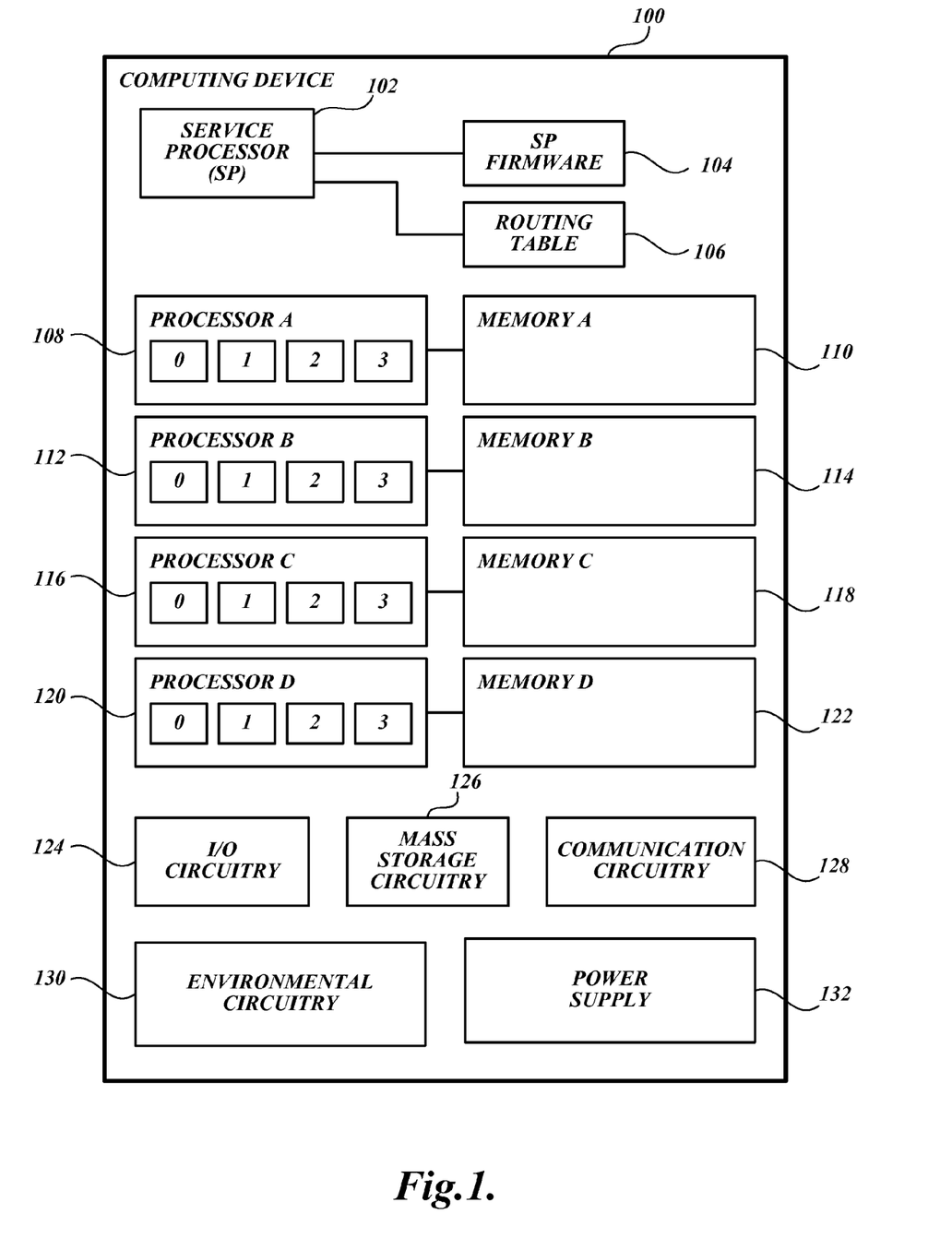
FIG. 1 is a block diagram of an example of a computing device capable of supporting partition unit replacement in accordance with one or more embodiments.

An exemplary computing device 100 for implementing a partitionable server capable of supporting partitions and partition unit addition and/or replacement is illustrated in block diagram form in FIG. 1. The exemplary computing device 100 shown in FIG. 1 comprises a service processor (SP) 102 that is connected to a memory that stores SP firmware 104 and a routing table 106. The computing device 100 also comprises processor A 108 connected to memory unit A 110, processor B 112 connected to memory unit B 114, processor C 116 connected to memory unit C 118, and processor D 120 connected to memory unit D 122. Each of the processors 108, 112, 116, and 120 contains four cores designated 0, 1, 2, and 3. The SP 102, which is controlled by the SP firmware 104, uses routing table 106 to manage the processors 108, 112, 126, 120 and memory units 110, 114, 118, and 122. Computing device 100 also comprises I/O (input/output) circuitry 124, mass storage circuitry 126, communication circuitry 128, environmental circuitry 130, and a power supply 132. The computing device 100 uses the I/O circuitry 124 to communicate with I/O devices. The computing device 100 uses the mass storage circuitry 126 to interact with internally and externally connected mass storage devices. The computing device 100 uses the communication circuitry 128 to communicate with external devices, usually over networks. The computing device 100 uses the environmental circuitry 130 to control environmental devices such as cooling fans, heat sensors, humidity sensors, etc. The power supply 132 powers the computing device 100. If, for example, SP 102 is replaced by a BMC, the BMC may communicate with and control the environmental circuitry 130 and the power supply 132 more precisely.

Figure 2:
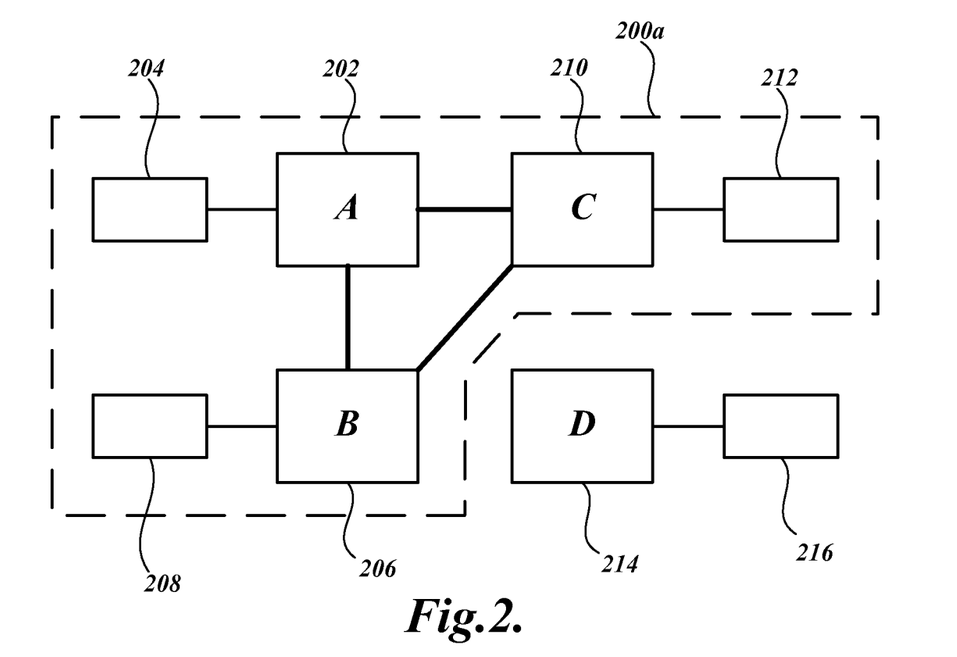
FIG. 2 is a block diagram of an example partition containing a plurality of partition units, one of which is unassociated, in accordance with one or more embodiments.
Figure 3:
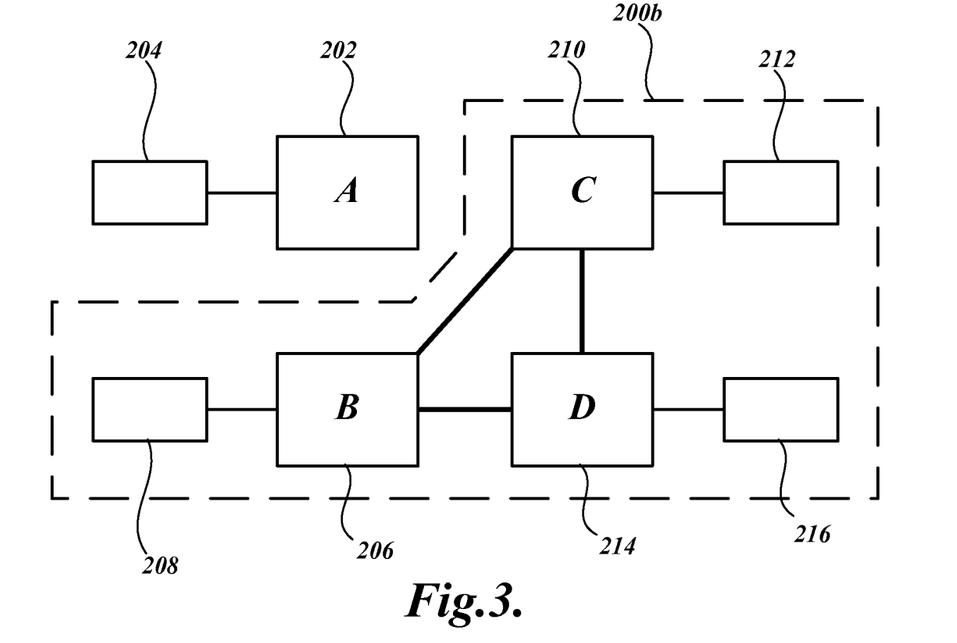
FIG. 3 is a block diagram of the example partition illustrated in FIG. 2 reconfigured to include the previously unassociated partition unit in accordance with one or more embodiments.

In FIG. 1, which illustrates an exemplary computing device for implementing a partitionable server, an exemplary partition unit may be formed from processor A 108 and memory block A 110, which is connected to processor A 108. Similarly, three more exemplary partition units may be formed from processor B 112 and memory block B 114; processor C 116 and memory block C 122; and processor D 120 and memory block D 122. The four exemplary partition units may form an exemplary partition that may be managed by SP 102. FIGS. 2 and 3 illustrate, in diagrammatic form, an exemplary partition similar the partition of FIG. 1 and having partition units similar to the partition units formed from the processors and memory blocks shown in FIG. 1.

The replacement of partition units may be understood by comparing the block diagram shown in FIG. 2 to the block diagram shown in FIG. 3. Both of the block diagrams shown in FIG. 2 and FIG. 3 include the same four partition units. Each of the partition units comprises a processor and a memory unit: processor A 202, connected to memory unit 204; processor B 206, connected to memory unit 208; processor C 210, connected to memory unit 212; and processor D 214, connected to memory unit 216. While the block diagrams in both FIG. 2 and FIG. 3 illustrate the same four partition units, the partition 200a shown in FIG. 2 comprises a different set of partition units when compared to the partition 200b shown in FIG. 3.

The partition 200a illustrated in FIG. 2 comprises: the processor A 202 connected to memory unit 204; the processor B 206 connected to memory unit 208; and processor C 210 connected to memory unit 212. In FIG. 2 the partition unit comprising the processor D 214 connected to the memory unit 216 is not included in partition 200a. In contrast to the partition 200a shown in FIG. 2, the partition 200b shown in FIG. 3 has been changed to comprise a different set of partition units, i.e., a different set of processors and memory units. The partition 200b shown in FIG. 3 comprises: the processor B 206 and memory unit 208; the processor C 210 and memory unit 212; and the processor D 214 and memory unit 216. In FIG. 3, the partition unit comprising the processor A 202 and the memory unit A 204 is not included in the partition 200b, whereas the partition unit comprising the processor D 214 and the memory unit 216 is included in partition 200a shown in FIG. 2. In effect, the partition unit comprising the processor D 214 and the memory unit 216 replaces the partition unit comprising the processor A 202 and memory unit 204. Such a replacement would be desirable if, for example, the processor A 202 and/or memory unit 204 were failing.

Replacing a partition unit involves identifying the hardware devices that require replacement and the replacement hardware devices. It is common for a processor, such as processor A 202, to have an Advanced Programmable Interrupt Controller ID (APIC ID) identifying the processor; and for a memory unit, such as memory unit 204, to have a physical address identifying the memory unit. Within a partition's local operating system, such as partition 200a's local operating system, a processor's APIC ID is uniquely identifies the processor. Similarly, within a partition's local operating system, a memory unit's physical address uniquely identifies the memory unit.

A computing device, such as computing device 100, shown in FIG. 1, may include a plurality of partitions. Each partition in the plurality of partitions runs a local operating system having a local view of the partition. The global management entity, such as SP 102, maintains a global namespace containing identifiers that uniquely identify each of the partitions with which the global management entity communicates.

During a partition unit replacement, such as the partition unit replacement shown in FIGS. 2 and 3 and described above, the global management entity and the local operating system of a partition communicate information concerning partition units. For example, the SP 102, shown in FIG. 1, i.e., the global management entity, communicates with partition 200*a*'s local operating system during the replacement of a partition unit. In order for the global management entity to distinguish the partition units of the same partition as well as the partition units of different partitions, the global management entity stores a unique identifier for each partition unit, i.e., a partition unit ID. Partition unit IDs are a combination of the partition ID and a hardware device identifier such as an APIC ID for a processor or a physical address for a memory unit. A unique global identifier can be created for processor C 210 by combining processor C 210's APIC ID with partition 200*a*'s partition ID. Similarly, a unique global identifier can be created for memory unit 212 by combining memory unit 212's physical address with partition 200*a*'s partition ID.

When a partition unit is replaced, each of the hardware devices in the partition unit is replaced. For example, as shown in FIGS. 2 and 3, a first partition unit comprises processor A 202 and the memory unit 204 that is connected to processor A 202; and, a second partition unit comprises processor D 214 and the memory unit 216 that is connected to processor A 214. When the second partition unit replaces the first partition unit, processor D 214 replaces processor A 202 and the memory unit 216 replaces memory unit 204.

Figure 4:
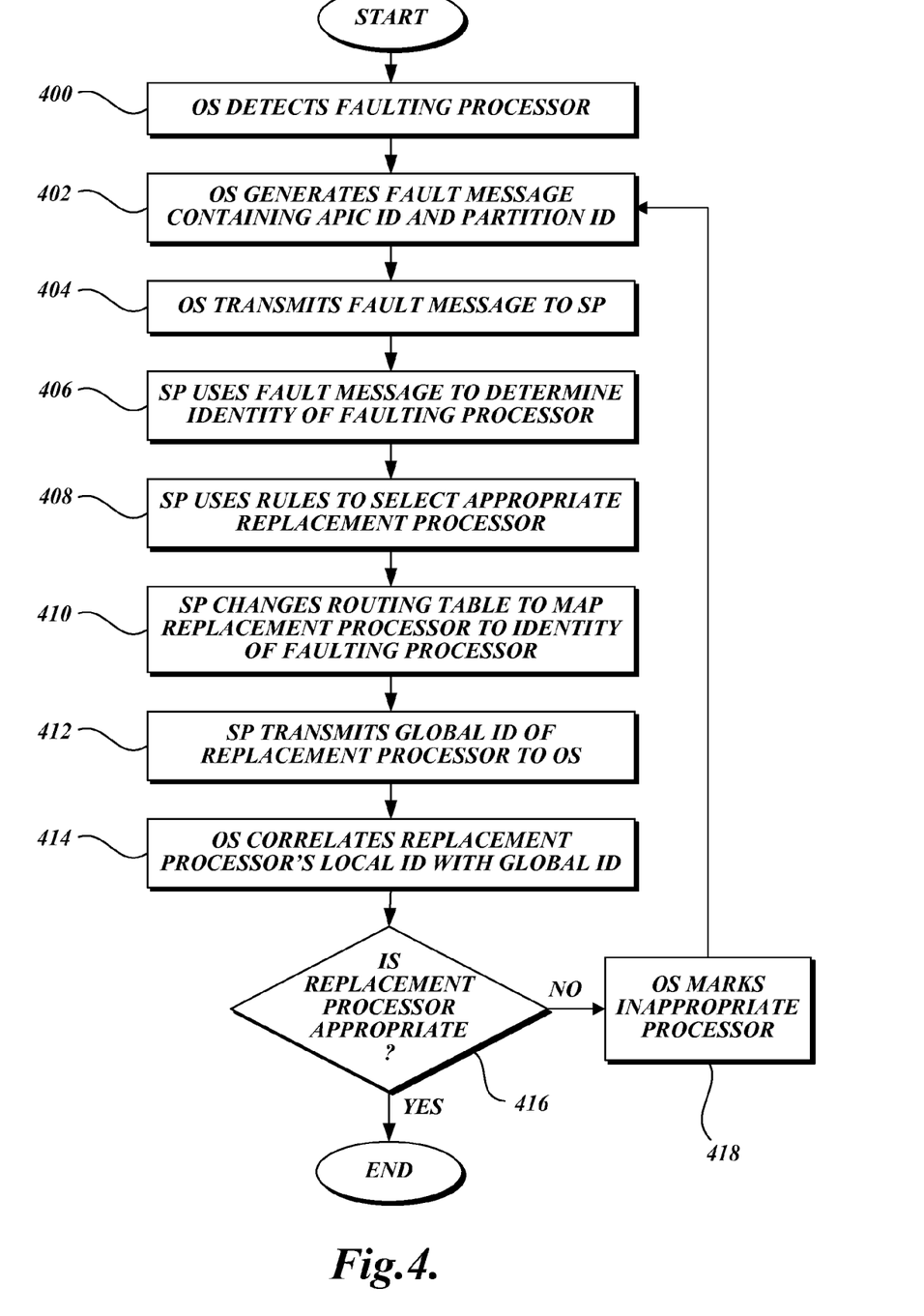
FIG. 4 is a functional flow diagram illustrating an example process for replacing a processor in accordance with one or more embodiments.
Figure 5:
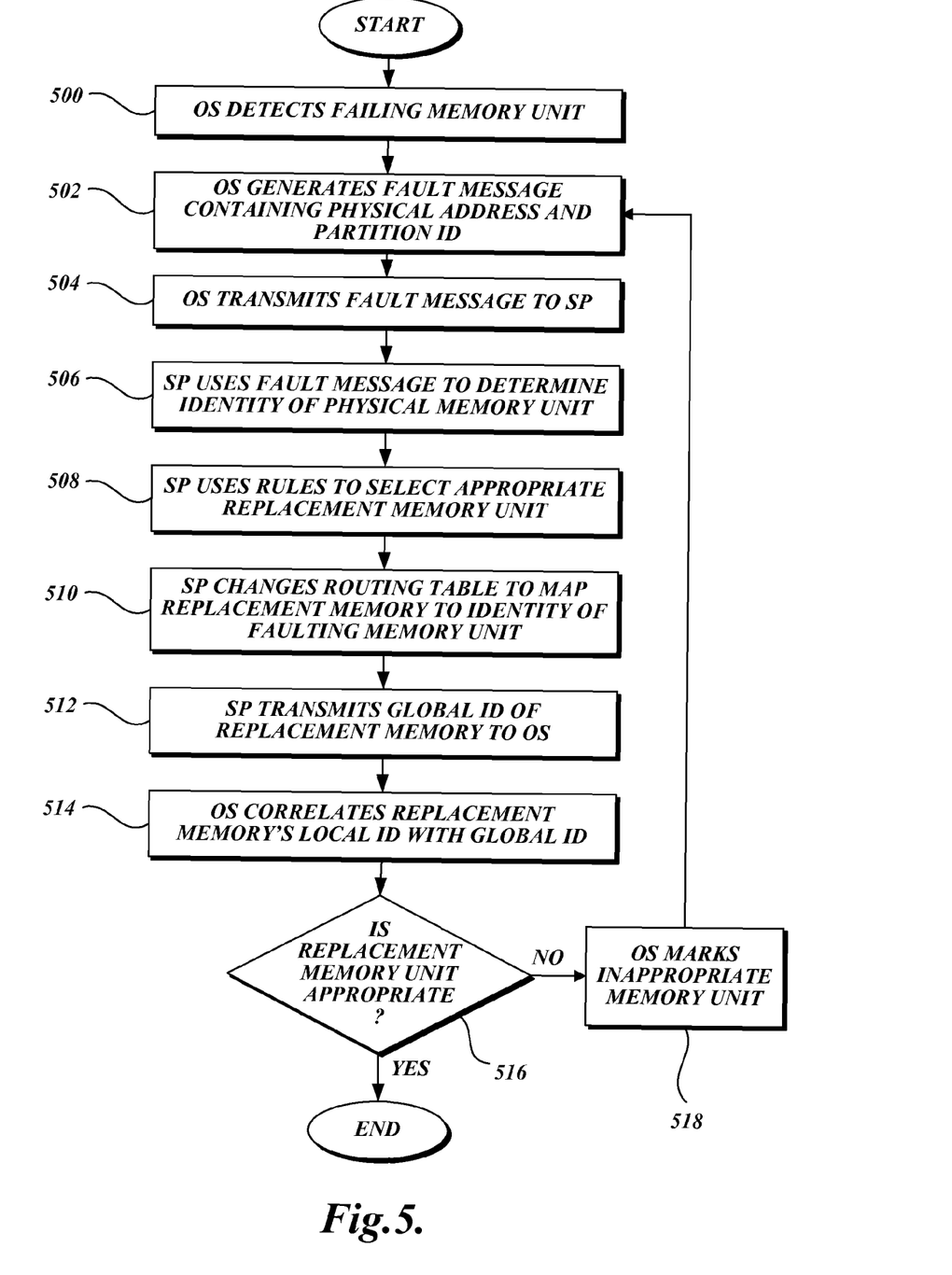
FIG. 5 is a functional flow diagram illustrating an example process for replacing a memory unit, i.e., memory controller and memory blocks, in accordance with one or more embodiments.

Preferably, replacing a partition unit is an "atomic" process. An atomic process is a process that is executed in a way that insures that an entity performing an operation that requires accessing the partition unit accesses the old partition unit, i.e., the partition unit to be replaced, or the "new" partition unit, i.e., the replacement partition unit, but not both during the same operation. FIGS. 4 and 5 illustrate processes for atomically replacing items in a partition unit, e.g., processors and memory units.

FIG. 4 is a functional flow diagram illustrating an exemplary process for replacing a processor in which the processor's identity is correlated between a local operating system and a global management entity. FIG. 4 begins at block 400 in which the operating system, i.e., local OS, detects a faulting or failing processor. For example, partition 200*a*'s OS may receive a series of error messages from processor A 202 that indicate that processor A 202 has had to repeatedly correct a recurring problem. As a result of the error message, the local OS decides that processor A 202 is a candidate for replacement. At block 402 the local OS, e.g., partition 200*a*'s OS, generates a fault message containing processor A 202's APIC ID and the partition ID of processor A 202. As noted above, the combination of a processor's APIC ID and the partition ID form a unique global identifier for the processor. At block 404, the partition 200*a*'s OS transmits the fault message, which uniquely identifies the faulting processor, to a global management entity, such as the SP 102 shown in FIG. 1.

It is also possible for the SP to receive information from the OS and make the decision to replace a processor. In such an implementation, preferably, the OS provides a self-contained error record that allows the SP to analyze one record, instead of having to collect the information from the faulting processor and possibly other sources. The OS can generate such a self-contained error message that is understood by the SP in the global namespace.

Continuing in FIG. 4 at block 406, the SP uses the fault message to determine the identity of the faulting processor. At block 408 the SP uses rules to select an appropriate replacement processor. An exemplary rule for selecting an appropriate replacement processor is: the selected replacement processor must have as much or more processing power than the processor to be replaced. Following such an exemplary rule, the SP may use the faulting processor's unique global ID to locate information about the faulting processor, perhaps in a table. The information in the table may indicate that the faulting processor is, for example, a four core processor. The SP searches the table for an available four core processor. The SP selects a suitable replacement from, possibly, multiple alternative replacements listed in the table.

Continuing in FIG. 4 at block 410, the SP changes the routing table to map the identity of the replacement processor to the identity of the faulting processor. At block 412 the SP transmits the global ID of the replacement processor to the local OS which informs the local OS that the replacement processor is in the partition. At block 414, the local OS correlates the local ID of the replacement processor with the global ID. At decision block 416 a test or check is made to determine if the replacement processor is the appropriate processor. For example, the capabilities of the replacement processor may be measured and if the replacement processor's capabilities are suitable, the replacement processor is determined to be appropriate. If the replacement processor is the appropriate processor the process ends. If the replacement processor is not the appropriate processor the operating system marks the inappropriate processor in block 418 and the control flows back to block 402.

Mapping a processor's global representation to the processor's local representation and checking the validity of the mapping by mapping the local presentation back to the global representation is particularly useful when more than one processor is failing and so more than one processor must be replaced. The validity of the local representation is then checked to make sure the local representation maps back into the global representation. Checking the validity of replacement processor with a faulting processor enables the SP to make a more suitable selection of a replacement processor to replace a faulting processor. For example, an "idle" processor, i.e., a processor that is active but performing no useful work, can be described in a global namespace such that an SP can access the idle processor without the OS's accessing the idle processor. The SP then indicates to an OS that the idle processor has been brought into the OS's partition for the purpose of replacing a faulting processor in the OS's partition. The replacement processor takes over the local identity of the processor being replaced. In the global context, the replacement processor is uniquely identified to the SP. That is, the SP can distinguish between all of the processors in all of the partitions. For example, the SP 102 can distinguish between processor A 108, processor B 112, processor C 116, and processor D 120 in computing device 100 shown in FIG. 1. By using the technique described above, processors can be swapped in and out of a partition transparently, without the partition's OS having to make special adjustments.

A process similar to the process illustrated in FIG. 4 and described above may be used to replace a memory unit. FIG. 5 is a functional flow diagram illustrating an exemplary process for replacing a memory unit, i.e., a memory controller and the memory blocks controlled by the memory controller, in which the memory unit's identity is correlated between a local operating system, i.e., OS, and a global management entity. FIG. 5 begins at block 500 in which the OS detects failing memory. For example, the OS gets information from a memory unit's memory controller indicating that the memory controller had to read from a memory location four times before completing a correct read. The OS determines that the memory unit containing the memory controller should be replaced. At block 502 the OS generates a fault message containing the physical address and partition ID of the memory unit. As noted above, the physical address and the partition unit of the memory unit form a unique global identifier for the memory unit.

At block 504 the operating system transmits the fault message to the SP, such as the SP 102 shown in FIG. 1. At block 506 the SP uses the fault message to determine the identity of the physical memory unit. At block 508 the SP uses rules to select an appropriate replacement memory unit. A replacement memory unit may be selected according to size, speed, etc. Another selection criteria may be the memory replacement unit's accessibility. It is possible to access one processor's memory unit by going through one or more other processors, called "hops." For example, processor A 202 may access the memory unit 212, for processor C 210, in one hop via processor C 210; or may access the memory unit 212 in two hops, one hop to processor B 206 and another hop to processor C 210. It is desirable to minimize the number of hops incurred for memory access. Hence, an appropriate replacement memory unit may be selected according to size, speed, and accessibility as determined by the number of hops.

Continuing in FIG. 5, at block 510 the SP changes the routing table to map the replacement memory unit to the identity of the faulting memory unit. At block 512 the SP transmits the global ID of the replacement memory unit to the OS. At block 514 the operating system correlates the replacement memory's local ID of the global ID. At decision block 516 a test or check is made to determine if the replacement memory unit is the appropriate memory. If the replacement memory is the appropriate memory then the process ends. If the replacement memory is not the appropriate memory then the control flows to block 518. In block 518 the OS marks the inappropriate memory and the control flows back to block 502.

In the processes illustrated in FIGS. 4 and 5 and described above, an SP fulfills the role of a global management entity. Other hardware devices, such as but not limited to a BMC, may fulfill the role of a global management entity. Hence, the use of an SP as a global management entity in the processes illustrated in FIGS. 4 and 5 should be construed as exemplary and not limiting.

While various embodiments have been illustrated and described, it will be appreciated that various changes can be made therein without departing from the spirit and scope of the invention. For example, in the processes described above, information about the faulting hardware devices primarily originates in the local operating systems and the decision to replace a faulting hardware device originates with the local operating systems. It is possible for the faulting information to be transmitted to the global management entity and have the global management entity make the decision to replace the faulting hardware device. Also, while the various embodiments described above deal with physical processors, it is also possible to apply similar processes to virtual processors.

What is claimed is:

1. A computer-implemented method comprising:
   receiving, from an instance of a local operating system, a fault message including a local identifier of a faulting device of a partition of a server;
   determining, based on the fault message, a global identifier of the faulting device, the global identifier different from the local identifier;
   searching, based on the global identifier, an information table for information associated with the faulting device;
   searching, based on the information associated with the faulting device, the information table for one or more available devices of the server;
   selecting, from the one or more available devices of the server, a replacement device for the faulting device of the partition of the server; and
   mapping the selected replacement device to the faulting device by updating a routing table effective to allow services of the instance of the local operating system to operate on the replacement device.

2. The computer-implemented method of claim 1, wherein the faulting device is a memory unit of the partition of the server.

3. The computer-implemented method of claim 2, wherein the replacement device is a replacement memory unit and selecting the replacement memory unit device is based on a size, speed, or accessibility of the replacement memory unit.

4. The computer-implemented method of claim 1, wherein the faulting device is a processor or processor core of the partition of the server.

5. The computer-implemented method of claim 4, wherein the global identifier indicates at least one of a processing capability or processing configuration of the faulting processor or processor core.

6. The computer-implemented method of claim 1, further comprising selecting, from the one or more available devices of the server, another replacement device for the faulting device in response to another fault message from the instance of the local operating system that indicates the selected replacement device is inappropriate.

7. The computer-implemented method of claim 1, wherein the replacement device includes an idle processor or an idle processor core of the server not included in the partition of the server.

8. The computer-implemented method of claim 1, wherein the local identifier of the faulting device includes at least one of an Advanced Programmable Interrupt Controller identifier (APIC ID) or a physical address of the faulting device.

9. The computer-implemented method of claim 1, wherein one or more acts of the method are implemented by a baseboard management controller or a service processor communicably coupled with the partition of the server.

10. One or more computer-readable memory devices embodying instructions, that when executed by a processor, implement a failover manager configured to:
    receive, from an instance of a local operating system, a fault message including a local identifier of a faulting device of a partition of a server;
    determine, based on the fault message, a global identifier of the faulting device, the global identifier different from the local identifier;
    search, based on the global identifier, an information table for information associated with the faulting device;
    search, based on the information associated with the faulting device, the information table for one or more available devices of the server;
    select, from the one or more available devices of the server, a replacement device for the faulting device of the partition of the server; and
    map the selected replacement device to the faulting device by updating a routing table effective to allow services of the instance of the local operating system to operate on the replacement device.

11. The one or more computer-readable memory devices 10, wherein the faulting device is a memory unit of the partition of the server.

12. The one or more computer-readable memory devices 11, wherein the replacement device is a replacement memory unit and selecting the replacement unit device is based on a size, speed, or accessibility of the replacement memory unit.

13. The one or more computer-readable memory devices 10, wherein the faulting device is a processor or processor core of the partition of the server.

14. The one or more computer-readable memory devices 13, wherein the global identifier indicates at least one of a processing capability or processing configuration of the faulting processor or processor core.

15. A computing device comprising:
a mass storage device storing an operating system;
one or more logical partitions of devices, each logical partition of devices configured to execute a respective instance of the operating system; and
one or more computer-readable memory storage devices storing an information table and a routing table; and
a service processor configured to:
receive, from one of the logical partitions executing a respective instance of the operating system, a fault message including a local identifier of a faulting device of the logical partition;
determine, based on the fault message, a global identifier of the faulting device of the logical partition, the global identifier different from the local identifier;
search, based on the global identifier, the information table for information associated with the faulting device of the logical partition;
search, based on the information associated with the faulting device, the information table for one or more available devices of the computing device;
select, from the one or more available devices, a replacement device for the faulting device for the logical partition; and
map the selected replacement device to the faulting device by updating a routing table effective to allow services of the respective instance of the operating system to be executed by the logical partition of the computing device.

16. The computer device of claim 15, wherein the faulting device is a memory unit of the logical partition of the computing device.

17. The computer device of claim 16, wherein the replacement device is a replacement memory unit and the selection of the replacement memory unit device is based on a size, speed, or accessibility of the replacement memory unit.

18. The computer device of claim 15, wherein the faulting device is a processor or processor core of the logical partition of the computing device.

19. The computer device of claim 18, wherein the global identifier indicates at least one of a processing capability or processing configuration of the faulting processor or processor core.

20. The computer device of claim 15, wherein the computing device is configured to select, from the one or more available devices of the computing device, another replacement device for the faulting device in response to another fault message from the respective instance of the operating system that indicates the selected replacement device is inappropriate.

* * * * *